US010924611B2

(12) United States Patent
Kanetsuki et al.

(10) Patent No.: US 10,924,611 B2
(45) Date of Patent: Feb. 16, 2021

(54) VOICE RECOGNITION SYSTEM AND CALL EVALUATION SETTING METHOD

(71) Applicant: Hitachi Information & Telecommunication Engineering, Ltd., Yokohama (JP)

(72) Inventors: Yuko Kanetsuki, Nakai (JP); Takashi Sugiyama, Nakai (JP); Terumi Saito, Nakai (JP)

(73) Assignee: HITACHI INFORMATION & TELECOMMUNICATION ENGINEERING, LTD., Yokohama (JP)

(*) Notice: Subject to any disclaimer, the term of this patent is extended or adjusted under 35 U.S.C. 154(b) by 137 days.

(21) Appl. No.: 16/181,388

(22) Filed: Nov. 6, 2018

(65) Prior Publication Data

US 2019/0199858 A1 Jun. 27, 2019

(30) Foreign Application Priority Data

Dec. 27, 2017 (JP) .............................. JP2017-250873

(51) Int. Cl.
| | | |
|---|---|---|
| *H04M 3/51* | (2006.01) | |
| *H04M 3/42* | (2006.01) | |
| *G10L 15/22* | (2006.01) | |
| *G10L 15/28* | (2013.01) | |
| *G10L 25/63* | (2013.01) | |

(52) U.S. Cl.
CPC ........... *H04M 3/5175* (2013.01); *G10L 15/22* (2013.01); *G10L 15/28* (2013.01); *G10L 25/63* (2013.01); *H04M 3/42221* (2013.01); *H04M 2201/40* (2013.01)

(58) Field of Classification Search
None
See application file for complete search history.

(56) References Cited

U.S. PATENT DOCUMENTS

| | | | | | |
|---|---|---|---|---|---|
| 2003/0033145 | A1* | 2/2003 | Petrushin | ................ | G10L 17/26 704/236 |
| 2014/0029742 | A1* | 1/2014 | Kawashima | ........ | H04M 3/2218 379/265.07 |
| 2014/0220526 | A1* | 8/2014 | Sylves | ............... | G06Q 30/0201 434/238 |
| 2015/0350438 | A1* | 12/2015 | Arslan | .................... | G10L 25/63 379/88.01 |
| 2017/0310820 | A1* | 10/2017 | Kao | ....................... | G10L 25/21 |

FOREIGN PATENT DOCUMENTS

JP 2017-135642 A 8/2017

\* cited by examiner

*Primary Examiner* — Harry S Hong

(74) *Attorney, Agent, or Firm* — Mattingly & Malur, PC

(57) ABSTRACT

An evaluation criterion for a call performed between an operator and a customer is set without taking time and effort. A voice recognition system includes a call recording unit that records a call performed between a customer and an operator, a voice recognition unit that recognizes the call recorded by the call recording unit and a value of non-verbal information indicating a feature of a calling party in the call and accumulates a recognized result in a storage unit, and a voice recognition result managing unit that sets a reference value for evaluating the calling party on the basis of the value of the non-verbal information included in the recognized result.

8 Claims, 8 Drawing Sheets

FIG. 2

| CALLING PARTY | EVALUATION VALUE ||
|---|---|---|
| | VOLUME | SPEAKING RATE |
| CUSTOMER | 50 | 50 |
| OPERATOR | 50 | 50 |

| CALLING NUMBER | EVALUATION VALUE ||
|---|---|---|
| | VOLUME | SPEAKING RATE |
| 090-3333-4444 | 50 | 50 |
| 090-1111-2222 | 60 | 50 |
| ... | ... | |

| OPERATOR ID | EVALUATION VALUE ||
|---|---|---|
| | VOLUME | SPEAKING RATE |
| OPERATOR A | 50 | 50 |
| OPERATOR B | 50 | 55 |
| ... | ... | |

| CALL ID | CALLING NUMBER | VOLUME | SPEAKING RATE | PER-CUSTOMER EVALUATION FLAGD |
|---|---|---|---|---|
| 1 | 090-3333-4444 | Good | Good | 1 |
| 2 | 090-1111-2222 | Bad | Good | 0 |
| ... | ... | ... | | |

FIG. 6

| CALL ID | CALL START DATE AND TIME | CALL END DATE AND TIME | CALLING NUMBER | EXTENSION | OPERATOR ID |
|---|---|---|---|---|---|
| 1 | 11/1 10:00:01 | 11/1 10:05:00 | 090-3333-4444 | 1001 | OPERATOR B |
| 2 | 11/1 10:00:02 | 11/1 10:04:50 | 090-1111-2222 | 1002 | OPERATOR C |
| ... | ... | ... | ... | ... | ... |

FIG. 7

| CALL START DATE AND TIME | CALL END DATE AND TIME | CALL ID | RECORD FILE PATH |
|---|---|---|---|
| 11/1 10:00:01 | 11/1 10:05:00 | 1 | E:¥Voice¥xxx1.wav |
| 11/1 10:00:02 | 11/1 10:04:50 | 2 | E:¥Voice¥xxx2.wav |
| ... | ... | ... | ... |

| WORD STRING START DATE AND TIME | CALL ID | CALLING PARTY | WORD | VOLUME | SPEAKING RATE |
|---|---|---|---|---|---|
| 11/1 10:00:01 | 1 | OPERATOR B | THANK YOU FOR CALLING | 52 | 50 |
| 11/1 10:00:11 | 1 | CUSTOMER 1 | I HAVE A QUESTION | 52 | 49 |
| ... | ... | ... | ... | ... | ... |
| 11/1 10:00:02 | 2 | OPERATOR A | THANK YOU FOR CALLING | 51 | 50 |
| 11/1 10:00:12 | 2 | CUSTOMER | IS IT FOR ○○ PRODUCT? | 67 | 53 |
| 11/1 10:00:20 | 2 | CUSTOMER | I DO NOT KNOW HOW TO USE IT WELL | 67 | 49 |
| ... | ... | ... | ... | ... | ... |

F I G. 1 0
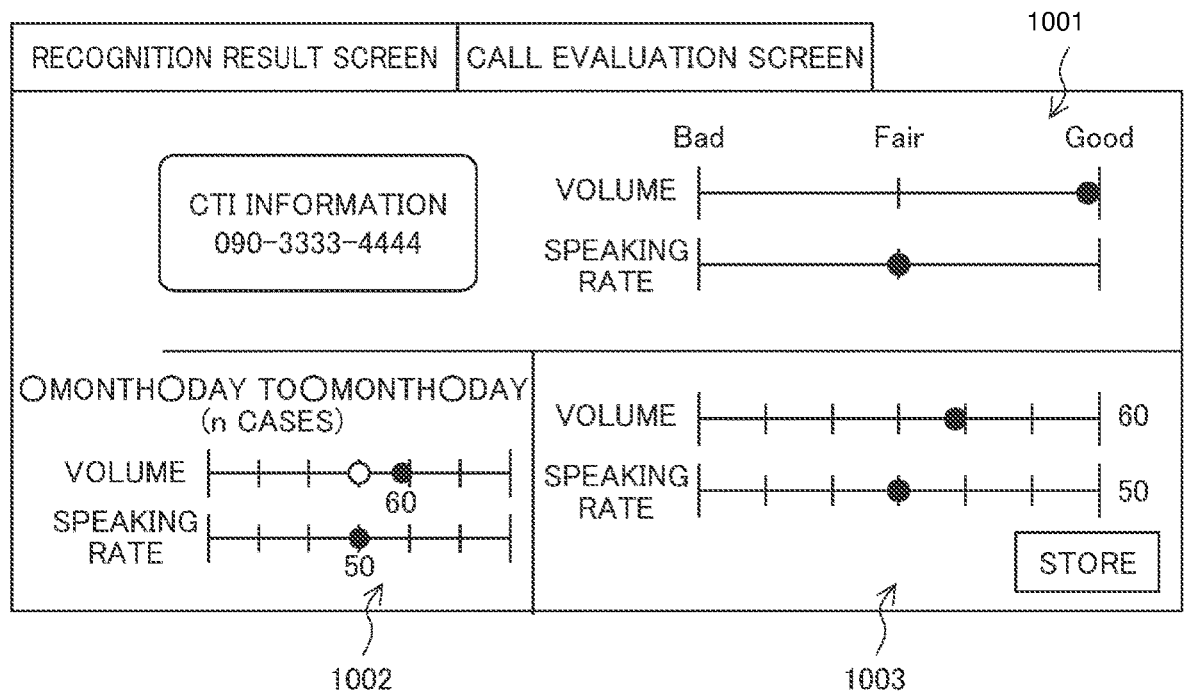

VOICE RECOGNITION SYSTEM AND CALL EVALUATION SETTING METHOD

CLAIM OF PRIORITY

The present application claims priority from Japanese application serial no. JP2017-250873, filed on Dec. 27, 2017, the content of which is hereby incorporated by reference into this application.

BACKGROUND OF THE INVENTION

1. Field of the Invention

The present invention relates to a voice recognition system and a call evaluation setting method.

2. Description of the Related Art

In the past, there has been a technique for evaluating a call between a customer and an operator in a call center. For example, in the technique disclosed in JP 2017-135642 A, a voice analysis text based on a call record file in which a call between the operator and the customer is recorded is compared with an evaluation criterion of a monitoring check item, and the operator is evaluated.

A result of recognizing the call between the customer and the operator by the system usually includes text information obtained by recording a call and converting it into a text, voice feature information such as a call volume, and call evaluation information obtained by evaluating a call in accordance with an evaluation criterion decided in advance on a system side. An administrator evaluates the call between the customer and the operator on the basis of such information. Therefore, since the evaluation is performed through comparison using the evaluation criterion decided in advance on the system side, when a calling party is a customer with a large voice even in a normal conversation, the customer may be evaluated to be lower than customers having an average voice volume since the customer is evaluated to be emotional.

Further, since even the same customer is different in a volume of voice depending on content, an environment, or a situation of a call, the administrator may manually revise an evaluation value indicating the evaluation criterion decided in advance on the system side. In this case, since it is necessary to revise it each time a call is performed with a customer, it takes time and effort. This point is similarly applied to the operator as well as the customer.

In the technique disclosed in JP 2017-135642 A, the call performed between the operator and the customer is evaluated using a predetermined criterion, but when the criterion is revised, it is necessary to revise it manually, and there is a problem in that it takes time and effort.

SUMMARY OF THE INVENTION

It is an object of the present invention to provide a voice recognition system and a call evaluation setting method which are capable of setting an evaluation criterion for a call performed between an operator and a customer without taking time and effort.

In order to solve the above-mentioned problems and achieve the object, a voice recognition system according to the present invention is configured as a voice recognition system including a call recording unit that records a call performed between a customer and an operator, a voice recognition unit that recognizes the call recorded by the call recording unit and a value of voice feature information indicating a feature of a calling party in the call and accumulates a recognized result in a storage unit, and a voice recognition result managing unit that sets a reference value for evaluating the calling party on the basis of the value of the voice feature information included in the recognized result.

Further, the present invention is also understood as a call evaluation setting method which is executed in the voice recognition system.

According to the present invention, it is possible to set an evaluation criterion for a call performed between an operator and a customer without taking time and effort.

BRIEF DESCRIPTION OF THE DRAWINGS

FIG. 2 is a diagram illustrating an example of a common evaluation value table;

FIG. 3 is a diagram illustrating an example of an evaluation value-per-customer table;

FIG. 4 is a diagram illustrating an example of an evaluation value-per-operator table;

FIG. 5 is a diagram illustrating an example of a call evaluation result table;

FIG. 6 is a diagram illustrating an example of a call information table;

FIG. 7 is a diagram illustrating an example of a recording information table;

FIG. 10 is a diagram illustrating an example of an evaluation screen displayed on the display device of the administrator terminal (call evaluation screen);

DETAILED DESCRIPTION OF THE PREFERRED EMBODIMENTS

Hereinafter, an embodiment of a voice recognition system and a call evaluation setting method according to the present invention will be described in detail with reference to the appended drawings.

Figure 1:
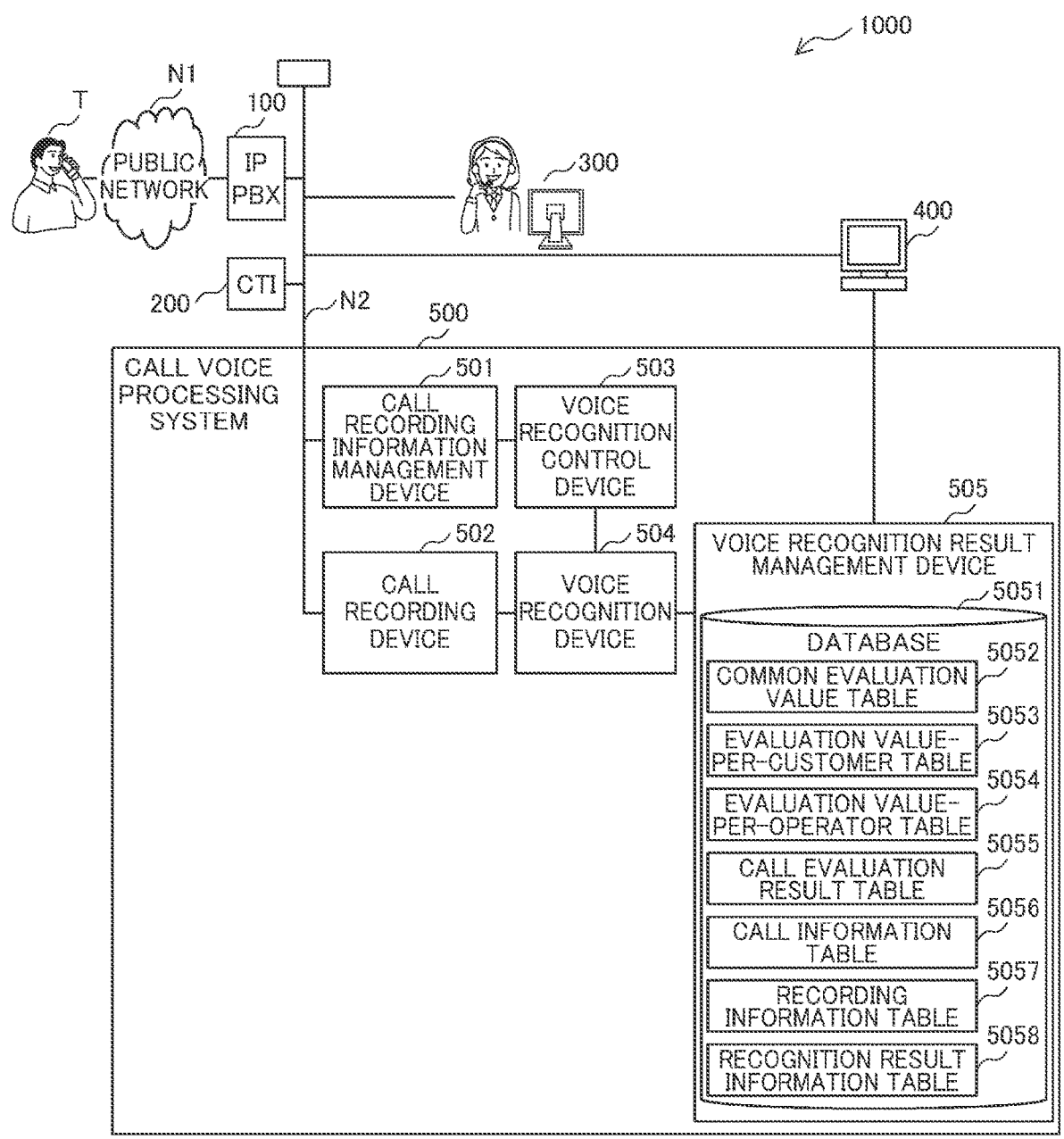
FIG. 1 is a diagram illustrating a configuration example of a call center.

FIG. 1 is a diagram illustrating a configuration example of a call center in which the voice recognition system according to the present embodiment is used. As illustrated in FIG. 1, a call center 1000 includes an Internet protocol-private branch exchange (IP-PBX) device 100, a computer telephony integration (CTI) server 200, an operator terminal 300, an administrator terminal 400, and a call voice processing system 500. A call terminal T of a customer and the IP-PBX device 100 are connected via a public network N1, and the IP-PBX device 100, the CTI server 200, the operator terminal 300, the administrator terminal 400, and the call voice processing system 500 are connected via an IP network N2 in the call center 1000.

The IP-PBX device 100 is a device which receives a call from the call terminal T of the customer and performs a process such as protocol conversion of the IP network and the public network N1, and call control for an outgoing call.

The CTI server 200 is a device that performs call control to the operator terminal 300. The CTI server 200 manages the call center 1000 in general and transmits a call received from the IP-PBX device 100 to the operator terminal 300 or the administrator terminal 400, and executes, for example, a process of giving a necessary instruction to the call voice processing system 500 when a call state is a connected state (a busy state).

The operator terminal 300 is a terminal operated by the operator of the call center 1000, and is constituted by, for example, a computer having a call function. The operator terminal 300 answers the call received from the IP-PBX device 100 in accordance with the instruction from the CTI server 200, and the operator performs a call by an external line via the public network N1 with the call terminal T of the customer.

The administrator terminal 400 is a terminal operated by the administrator of the call center 1000, and is constituted by, for example, a computer having a call reproduction function. The administrator terminal 400 can monitor an operation situation of the operator terminal 300 and a work situation of the operator, transmit an evaluation request for evaluating a call or a record file acquisition request to the call voice processing system 500, and acquires a call evaluation or acquires and reproduces a recorded call. An operation of the administrator terminal 400 and a screen example thereof will be described later.

The call voice processing system 500 is a system that records and recognizes the calls between the customer and the operator and manages recording results and recognition results.

As illustrated in FIG. 1, the call voice processing system 500 includes a call recording information management device 501, a call recording device 502, a voice recognition control device 503, a voice recognition device 504, and a voice recognition result management device 505.

The call recording information management device 501 accumulates CTI information such as a calling number issued from the call terminal T of the customer or an extension number issued from the operator terminal 300 and record information including call voices which are brought out from the customer terminal T of the calling number or the extension number issued from the operator terminal 300 and mirrored by the call recording device 502. Further, upon receiving the record information from the call recording device 502, the call recording information management device 501 gives a notification indicating that the record information is received from the call recording device 502 to the voice recognition control device 503.

The call recording device 502 mirrors the call voice and records the mirrored call voice. Further, the call recording device 502 outputs the record information including the call voice to the call recording information management device 501 and the voice recognition device 504.

Upon receiving the notification indicating that the record information is received from the call recording device 502 from the call recording information management device 501, the voice recognition control device 503 gives an instruction to execute a recognition process for recognizing the call voice to the voice recognition device 504.

The voice recognition device 504 includes a voice recognition engine for executing the recognition process and outputs a recognition result obtained as a result of the process and the CTI information or the call voice included in the record information received from the call recording device 502 to the voice recognition result management device 505.

The voice recognition result management device 505 is a device which manages the recognition result and includes a database 5051 that accumulates various kinds of data used in the present system. A common evaluation value table 5052, an evaluation value-per-customer table 5053, an evaluation value-per-operator table 5054, a call evaluation result table 5055, a call information table 5056, a recording information table 5057, and a recognition result information table 5058 are accumulated in the database 5051. Further, the voice recognition result management device 505 outputs the recognition result, a call evaluation result, an evaluation value setting screen in accordance with, for example, a request from the administrator terminal 400. Although the data accumulated in the database 5051, the recognition result, the call evaluation result, and the evaluation value setting screen will be described later, the recognition result includes text information obtained by recording a call and converting it into a text and voice feature information indicating features of a calling party such as a call volume or a speaking rate. Further, the evaluation value is a value of an item serving as a criterion for evaluating the calling party.

Each of the devices constituting the call voice processing system 500 is constituted by a general computer as hardware. In the present embodiment, it is assumed that the call recording information management device 501, the call recording device 502, the voice recognition control device 503, the voice recognition device 504, and the voice recognition result management device 505 are different devices, but these devices may be implemented by one or more devices depending on a usage environment.

FIG. 2 is a diagram illustrating an example of the common evaluation value table 5052. The common evaluation value table 5052 is a table that stores an evaluation value preset on the system side as an evaluation criterion common to the call voice processing system 500. As illustrated in FIG. 2, the calling party and an evaluation value of the calling party are stored in the common evaluation value table 5052 in association with each other in advance.

In FIG. 2, for example, it is illustrated that when, during a call, a size of a volume of a customer or an operator is 50, and a speaking rate is 50, the customer or the operator is evaluated to be a standard customer or operator. Therefore, when there is a divergence of a certain threshold value or more with respect to these values, the evaluation will be lowered by determination on the system side.

FIG. 3 is a diagram illustrating an example of the evaluation value-per-customer table 5053. The evaluation value-per-customer table 5053 is a table that stores an evaluation value which is an evaluation criterion per customer set on the basis of a feature of the customer. As illustrated in FIG. 3, the calling number of the customer who is the calling party and the evaluation value of the customer are stored in the evaluation value-per-customer table 5053 in association with each other.

In FIG. 3, for example, it is illustrated that, during a call, the size of the volume of a customer with a calling number "090-3333-4444" is 50, and the speaking rate is 50 . Further, it is illustrated that, during a call, the size of the volume of a customer with a calling number "090-1111-2222" is 60 which is larger than that of the customer with the calling number "090-3333-4444," and the speaking rate is 50 which is the same as that of the customer with the calling number "090-3333-4444."

FIG. 4 is a diagram illustrating an example of the evaluation value-per-operator table 5054. The evaluation value-per-operator table 5054 is a table that stores an evaluation value which is an evaluation criterion per operator set on the basis of a feature of the operator. As illustrated in FIG. 4, an operator ID identifying the operator as the calling party and an evaluation value of the operator are stored in the evaluation value-per-operator table 5054 in association with each other.

In FIG. 4, for example, it is illustrated that, during a call, the size of the volume of an operator identified by an operator ID "operator A" is 50, and the speaking rate is 50. Further, it is illustrated that during a call, the size of the volume of an operator identified by an operator ID "operator B" is 50 which is equal to that of the operator with the operator ID "operator A," and the speaking rate is 55 which is faster than that of the operator with the operator ID "operator A."

In FIGS. 3 and 4, the volume and the speaking rate of the calling party are used as an example of the evaluation value based on the feature of the calling party, but for example, other items for evaluating a call such as a speech period of time, a silent period of time, the presence or absence of a topic, or the presence or absence of a keyword may be set as the evaluation value.

FIG. 5 is a diagram illustrating an example of the call evaluation result table 5055. The call evaluation result table 5055 is a table that stores an evaluation result based on the evaluation value for each call performed between the customer and the operator. As illustrated in FIG. 5, a call ID identifying a call, the calling number of the customer in the call, the evaluation result of the customer, and a per-customer evaluation flag identifying a table used when the customer is evaluated are stored in the call evaluation result table 5055 in association with one another.

In FIG. 5, for example, it is illustrated that the call identified by a call ID "1" is a call performed with the customer with the calling number "090-3333-4444 ," and evaluations for the volume and the speaking rate of the customer are both "Good" indicating that they are good. Further, it is illustrated that an evaluation for the call is performed using the evaluation value-per-customer table 5053 illustrated in FIG. 3. Further, it is illustrated that a call identified with a call ID "2" is a call performed with a customer with a calling number "090-1111-2222," and an evaluation for the speaking rate of the customer is "Good," but an evaluation for the volume is "Bad" indicating that it is not good. Further, it is illustrated that an evaluation for the call is performed using the common evaluation value table 5052 illustrated in FIG. 2.

Incidentally, a case in which the call evaluation result for the customer is stored is illustrated in FIG. 5, but the same can be applied to a case in which a call evaluation result for the operator as well. In this case, the calling number in FIG. 5 may be replaced with the extension number, and a flag indicating that the evaluation value-per-operator table 5054 illustrated in FIG. 4 be used may be set in the per-customer evaluation flag instead of the per-customer evaluation flag.

FIG. 6 is a diagram illustrating an example of the call information table 5056. The call information table 5056 is a table that stores CTI information such as origination and termination of the call for each call performed between the customer and the operator. As illustrated in FIG. 6, a call ID identifying a call, a start date and time and an end date and time of the call, the calling number of the customer in the call, the extension number of the operator in the call, and the operator in charge of the call to the extension number are stored in the call information table 5056 in association with one another.

In FIG. 6, for example, it is illustrated that a call identified by a call ID "1" started at 10:00:01 on Nov. 1 and ended at 10:05:00 on Nov. 1. Further, it is illustrated that the call was performed between the customer with the calling number "090-3333-4444" and the operator B in charge of the extension number "1001."

FIG. 7 is a diagram illustrating an example of the recording information table 5057. The recording information table 5057 is a table that stores the call voice when the call is recorded for each call performed between the customer and the operator. As illustrated in FIG. 7, the start date and time and the end date and time of the call, the call ID identifying the call, and a record file path indicating a storage location of the call voice in the recorded call are stored in the recording information table 5057 in association with one another.

In FIG. 7, for example, it is illustrated that the call which started at 10:00:01 on November 1 and ended at 10:05:00 on November 1 is the call identified by the call ID "1," and record data of the call is stored in "E:\Voice\xxx1.waw."

Figures 8, 9:
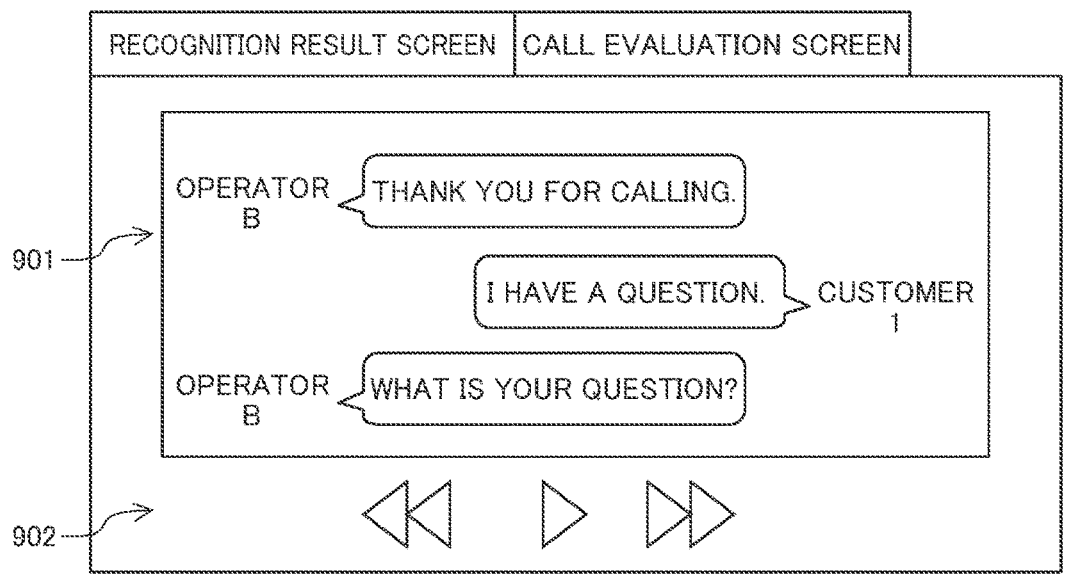
FIG. 8 is a diagram illustrating an example of a recognition result information table.
FIG. 9 is a diagram illustrating an example of an evaluation screen displayed on a display device of an administrator terminal (recognition result screen)

FIG. 8 is a diagram illustrating an example of the recognition result information table 5058. The recognition result information table 5058 is a table that accumulates and stores results recognized by the voice recognition device 504 in the call for each of calls performed between the customer and the operator until now. As illustrated in FIG. 8, a word string start date and time indicating a timing at which a word included in the call is spoken, the call ID identifying the call, the calling party of the call, a word spoken by the calling party, the volume at which the word is spoken, and the speaking rate at which the word is spoken are stored in the recognition result information table 5058 in association with one another.

In FIG. 8, for example, it is illustrated that, in the call which is identified by the call ID "1" and started at 10:00:01 on November 1, the operator B speaks "Thank you for calling," the volume was 52, and the speaking rate was 50. Further, it is illustrated that thereafter, a customer 1 spoke "I have a question," the actual volume at that time was 52, and the speaking rate was 49. Next, an operation of the administrator terminal 400 and a screen example thereof will be described.

As described above, the administrator terminal 400 is constituted by a general computer as hardware, and is connected with an input device such as a keyboard or a mouse or a display device such as a liquid crystal display (LCD).

FIGS. 9 and 10 are diagrams illustrating examples of an evaluation screen displayed on the display device of the administrator terminal 400. The evaluation screen includes a recognition result screen (FIG. 9) in which a result recognized by the voice recognition device 504 is displayed and a call evaluation screen (FIG. 10) in which a recognized call is evaluated. These screens are switched by the administrator clicking a tab via the input device. These screens are displayed on the display device of the administrator terminal 400 by the voice recognition result management device 505.

FIG. 9 is a diagram illustrating an example of the recognition result screen. As illustrated in FIG. 9, a call display region 901 in which a call performed between the operator and the customer is displayed in a text form and a speaking rate change region 902 for changing the speaking rate of the call are displayed in the recognition result screen. The text displayed on the call display region 901 is information displaying a result which is recognized by the voice recognition device 504 and stored in the recognition result information table 5058 chronologically. For example, the voice recognition result management device 505 reads the recognition result information table 5058 in accordance with a request or the like received from the administrator terminal 400, and transmits the recognition result of the corresponding call to the administrator terminal 400. The request includes items of the recognition result information table 5058 such as the call ID or the calling party in which the call is evaluated, the call start date and time, and the call end date and time.

Further, a cursor key (an arrow key) for changing the speaking rate of the call is displayed in the speaking rate change region 902, and when the administrator clicks the cursor key by operating the input device, the voice recognition result management device 505 reduces or increase the reproduction speed of the recorded call voice in accordance with the operation. In FIG. 9, the call between the operator B and the customer 1 stored in the recognition result information table 5058 illustrated in FIG. 8 is displayed.

FIG. 10 is a diagram illustrating an example of the call evaluation screen. As illustrated in FIG. 10, a call evaluation result region 1001 indicating the result obtained by the system evaluating the call for each calling number of the customer, a previous call reference value region 1002 indicating a statistical value of an evaluation value in the calling number of the customer in the past, and an evaluation value setting region 1003 in which an evaluation value of a current call is set with reference to the call evaluation result region 1001 and the previous call reference value region 1002 are displayed in the call evaluation screen.

The calling number corresponding to the call ID of the call displayed in the recognition result screen illustrated in FIG. 9 among the data stored in the recognition result information table 5058 and the evaluation result corresponding to the calling number are displayed in the call evaluation result region 1001. In FIG. 10, it is illustrated that as the evaluation result the customer with the calling number "090-3333-4444" until now, the volume is "Good," and the speaking rate is "Fair."

These evaluation result can be obtained by reading the volume and the speaking rate corresponding to the call ID of the call stored in the recognition result information table 5058 illustrated in FIG. 8 and the volume and the speaking rate stored as the evaluation value of the calling number corresponding to the call ID among the data stored in the evaluation value-per-customer table 5053 illustrated in FIG. 3 or the volume and the speaking rate stored as the evaluation value of the customer among the data stored in the common evaluation value table 5052 illustrated in FIG. 2 and determining whether or not a degree of divergence between both pieces of information by the voice recognition result management device 505, and the result is stored in the call evaluation result table 5055 illustrated in FIG. 5.

For example, the voice recognition result management device 505 reads the volume and the speaking rate of the customer in the call of the calling number "090-3333-4444" among the records accumulated in the recognition result information table 5058 illustrated in FIG. 8, determines whether or not the read volume and the read speaking rate diverge from the volume and the speaking rate stored in the common evaluation value table 5052 illustrated in FIG. 2 or the volume and the speaking rate stored in the evaluation value-per-customer table 5053 illustrated in FIG. 3 by a certain threshold value or more, evaluates them to be "Bad (not good)" when the read volume and the read speaking rate diverge by a certain threshold value or more, and evaluates them to be "Good" when the read volume and the read speaking rate do not diverge by a certain threshold value or more. Further, when it is determined that the degree of divergence from a certain threshold value is less than a predetermined numerical value (that is, it is near the threshold value), the voice recognition result management device 505 evaluates them to be "Fair", and stores the result in the call evaluation result table 5055 illustrated in FIG. 5.

Further, the recognition result identified by the call ID corresponding to the calling number displayed in the call evaluation result region 1001 is specified from the recognition result information table 5058 illustrated in FIG. 8, and the statistical values of the volume and the speaking rate associated with the specified recognition result are displayed in the previous call reference value region 1002. In FIG. 10, it is illustrated that there are n recognition results of calls of the calling number "090-3333-4444" by O month O day to O month O day, and the statistical values of the volume and the speaking rate in the calls are 50 and 60, respectively.

For example, these reference values are calculated as follows. The voice recognition result management device 505 accesses the call information table 5056 illustrated in FIG. 6 using the calling number (for example, the calling number "090-3333-4444") displayed in the call evaluation result region 1001 as a key, and specifies the call ID corresponding to the calling number. Further, the voice recognition result management device 505 accesses the recognition result information table 5058 illustrated in FIG. 8 using the specified call ID as a key, and reads the volume and the speaking rate corresponding to the call ID. The voice recognition result management device 505 calculates respective statistical values (for example, average values) of the read volume and the read speaking rate.

Further, the evaluation values of the volume and the speaking rate in the call of the calling number displayed in the call evaluation result region 1001 are displayed in the evaluation value setting region 1003. The evaluation value is set, for example, by comparing these values with reference to the evaluation result displayed in the call evaluation result region 1001 and the statistical values of the volume and the speaking rate displayed in previous call reference value region 1002 through the voice recognition result management device 505. When the statistical values of the volume and the speaking rate displayed in the previous call reference value region 1002 are 50 and 60, respectively, and the evaluation results of the volume and the speaking rate displayed in the call evaluation result region 1001 are "Good" and "Fair," the voice recognition result management device 505 learns that the volume is "Good" when the volume is 50 and learns the speaking rate is "Fair" when the speaking rate is 60.

With the learning, it is possible to determine a relation between the evaluation value and the evaluation result which can be obtained when the evaluation value is set. Therefore, with the learning, the voice recognition result management device 505 determines a value which is evaluated to be "Good" (for example, "60" in the case of the volume) as the evaluation value to be set in the evaluation value-per-customer table 5053 illustrated in FIG. 3 and sets it as the evaluation value of the table. In FIG. 10, it is understood that the volume and the speaking rate in the current call serving as the evaluation target are set as 50 and 60, respectively, as a result of learning the evaluation result displayed in the call evaluation result region 1001 or the statistical values of the volume and the speaking rate displayed in the previous call reference value region 1002.

Incidentally, in FIG. 10, the call evaluation screen for the customer is illustrated, but the same can be applied to the call evaluation screen for the operator as well. In this case, the extension number is displayed instead of the calling number displayed as the CTI information, and a call evaluation result for the operator and the reference value or the evaluation value of the previous call are displayed.

Figure 11:
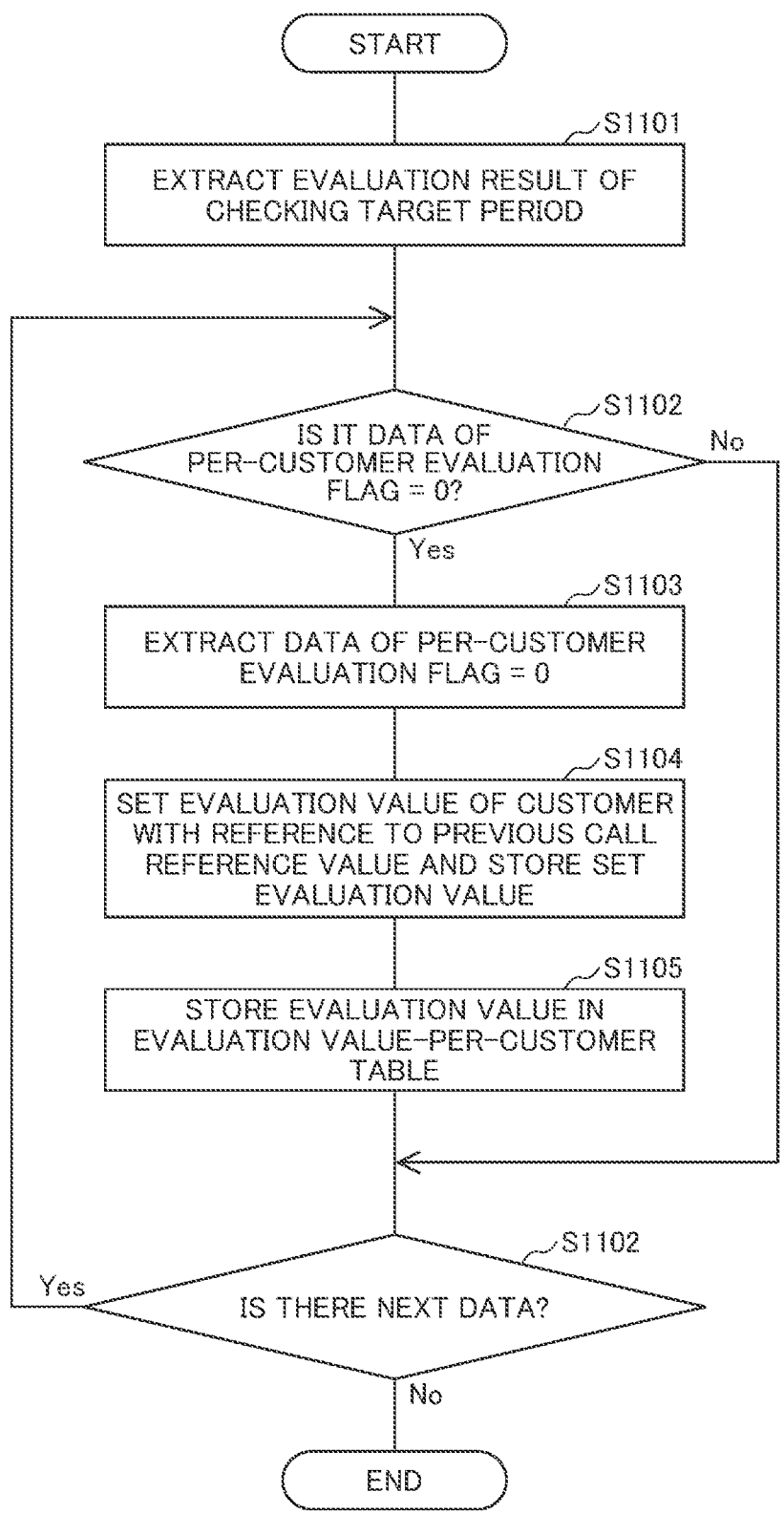
FIG. 11 is a flowchart illustrating a procedure for generating the evaluation value-per-customer table illustrated in FIG. 3.

FIG. 11 is a flowchart illustrating a procedure for generating the evaluation value-per-customer table 5053 illustrated in FIG. 3. As illustrated in FIG. 11, the voice recognition result management device 505 first extracts an evaluation result of a checking target period (step S1101). The checking target period is a period in which the customer evaluation is performed. For example, for a certain calling number, a period such as 10:00:00 on Nov. 1, 2017 to 09:59:59 on Nov. 10, 2017 is decided, and with access to the recognition result information table 5058 illustrated in FIG. 8 is performed using the date and times in the period as a key, and a record including a word string start date and time in the period is extracted.

Then, access to the call evaluation result table 5055 illustrated in FIG. 5 is performed using the call ID included in the extracted record as a key, and it is determined whether or not the per-customer evaluation flag corresponding to the call ID is "0" (step S1102).

When it is determined that the per-customer evaluation flag corresponding to the call ID is not "0" (step S1102; No), the process proceeds to step S1106, and when it is determined that the per-customer evaluation flag corresponding to the call ID is "0" (step S1102; Yes), the voice recognition result management device 505 extracts the record in which the per-customer evaluation flag is "0" (step S1103).

The voice recognition result management device 505 accesses the recognition result information table 5058 illustrated in FIG. 8 using the call ID of the extracted record in which the per-customer evaluation flag "0" as a key, reads the volume and the speaking rate of the call ID recognized during the call, and calculates previous call reference values which are the statistical values of the previous volume and the previous speaking rate in the call ID (step S1104). A method of calculating the previous call reference values will be described later with reference to FIG. 12.

The voice recognition result management device 505 stores the values of the volume and the speaking rate calculated as the previous call reference values and the values of the volume and the speaking rate of the calling number of the call identified by the call ID as the evaluation values of the evaluation value-per-customer table 5053 illustrated in FIG. 3 (step S1105). The voice recognition result management device 505 determines whether or not there is a record for the same calling number in the recognition result information table 5058 illustrated in FIG. 8 (step S1106), and when it is determined that there is a record (step S1106; Yes), the process returns to step S1102, and the process is continued until there are no record serving as a target. On the other hand, when it is determined that there is no record (step S1106; No), the voice recognition result management device 505 ends the process.

Figure 12:
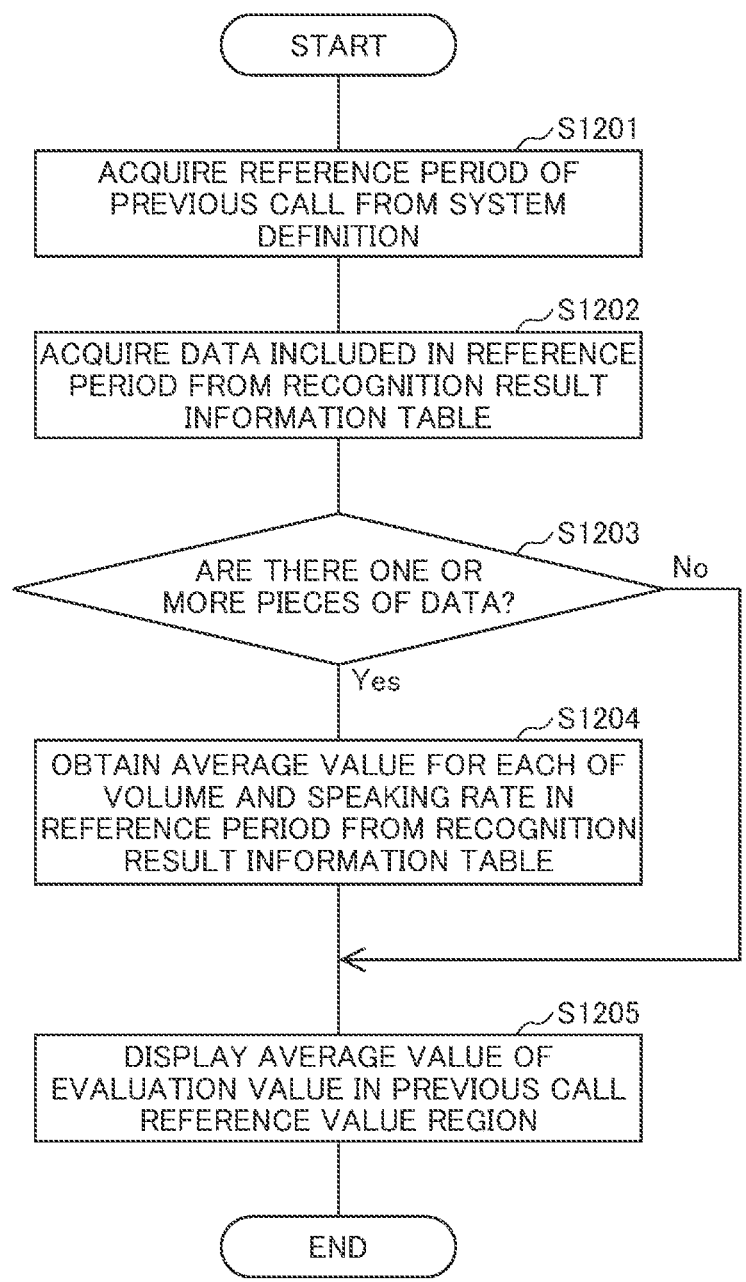
FIG. 12 is a flowchart illustrating a process procedure of step S1104 in the procedure of generating the evaluation value-per-customer table illustrated in FIG. 11.

FIG. 12 is a flowchart illustrating a process procedure of step S1104 in the procedure of generating the evaluation value-per-customer table 5053 illustrated in FIG. 11.

As illustrated in FIG. 12, the voice recognition result management device 505 acquires the reference period of the previous call defined in advance by the system (step S1201). For example, a period of a call serving as a target used as the previous call reference value among the previous calls such as a period from 10:00:00 on Nov. 1, 2017 to 09:59:59 on Nov. 10, 2017 is decided as the reference period.

The voice recognition result management device 505 accesses the recognition result information table 5058 illustrated in FIG. 8 using the reference period as a key, and extracts a record including the call ID corresponding to the calling number of the call set as the evaluation target within the period (step S1202). The voice recognition result management device 505 determines whether or not there are one or more records in the period (step S1203), and when it is determined that there are no one or more records within the period (step S1203; No), the process proceeds to step S1204.

On the other hand, when it is determined that there are one or more records within the period (step S1203; Yes), the voice recognition result management device 505 calculates an average value for each of the volume and the speaking rate within the extracted record (step S1204). The voice recognition result management device 505 displays the average value for each of the calculated volume and the speaking rate in the previous call reference value region 1002 of the call evaluation screen illustrated in FIG. 10 (step S1205). Incidentally, in the process illustrated in FIG. 12, the average values are calculated as the statistical values of the volume and the speaking rate, but other statistical values such as median values or mode values may be calculated.

Incidentally, in FIG. 12, the process procedure of step S1104 in the procedure of generating the evaluation value-per-customer table 5053 has been described, but the same can be applied to the evaluation value-per-operator table 5054 as well. In this case, the record extracted in step S1202 may be a record including the call ID corresponding to the extension number of the call set as the evaluation target.

Figure 13:
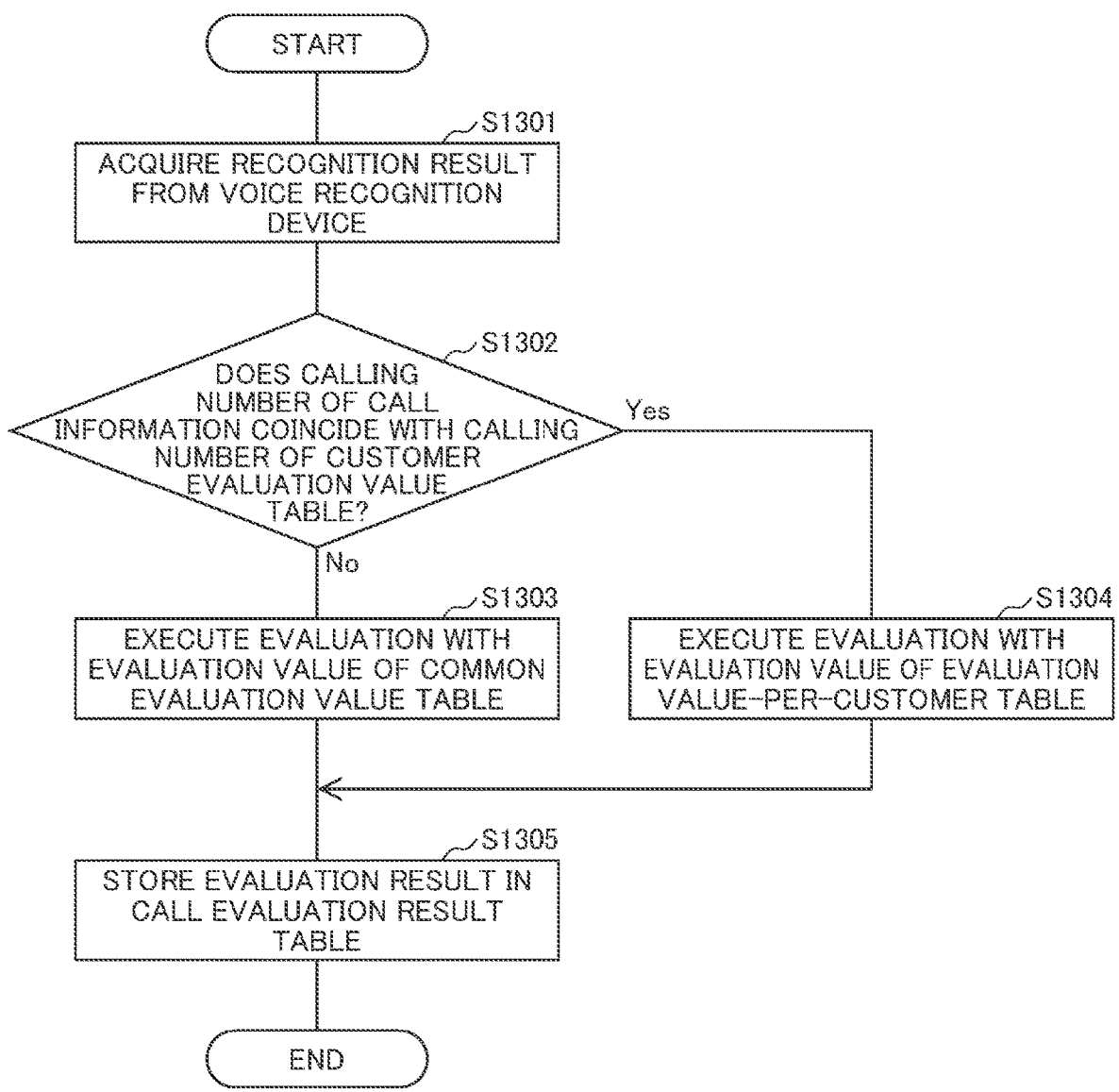
FIG. 13 is a flowchart illustrating a process procedure of a process of selecting an evaluation value table to be used at the time of call and evaluating a call.

FIG. 13 is a flowchart illustrating a process procedure of a process of selecting the evaluation value table to be used during the call and evaluating the call. As illustrated in FIG. 13, the voice recognition result management device 505 acquires the recognition result recognized by the voice recognition device 504 from the recognition result information table 5058 illustrated in FIG. 8 (step S1301) and determines whether or not the calling number corresponding to the call ID included in the recognition result coincides with a calling number stored in the evaluation value-per-customer table 5053 illustrated in FIG. 3 by comparing the calling number corresponding to the call ID included in the recognition result with a calling number stored in the evaluation value-per-customer table 5053 illustrated in FIG. 3 (step S1302).

When it is determined that there is no coinciding calling number (step S1302; No), the voice recognition result management device 505 reads the evaluation value for the customer among the evaluation values stored in the common evaluation value table 5052 illustrated in FIG. 2, and executes the evaluation (step S1303). On the other hand, when it is determined that there is a coinciding calling number (step S1302; Yes), the voice recognition result management device 505 reads the evaluation value stored in the evaluation value-per-customer table 5053 illustrated in FIG. 3 and executes the evaluation (step S1304). In the evaluation in step S1303 and step S1304, it is assumed that the setting is performed by the system, but the administrator may manually set it from the input device of the administrator terminal 400.

The voice recognition result management device 505 stores the result of the evaluation performed in step S1302 or step S1303 in the call evaluation result table 5055 illustrated in FIG. 5, and displays the call evaluation screen illustrated in FIG. 10 on display device of the administrator terminal 400 (step S1305).

Incidentally, in FIG. 12, a case in which the evaluation value-per-customer table 5053 is used has been described, but the same can be applied to a case in which the evaluation value-per-operator table 5054 is used as well. In this case, in step S1304, the evaluation value stored in the evaluation value-per-operator table 5054 illustrated in FIG. 4 may be read and evaluated.

As described above, in the present embodiment, since the above-described process is performed, so that it is possible to set the evaluation criterion of the call performed between the operator and the customer without taking time and effort. In other words, in the present system, in addition to the evaluation value of the call evaluation defined on the system side, the call is evaluated using the evaluation values defined for each customer and each operator by the administrator, and thus it is unnecessary to revise the defined call evaluation. In the voice recognition system of the related art, since the call can only be evaluated with the evaluation value uniformly defined by the system, it is unable to correspond to the feature of the customer or the operator, and the evaluation may be lowered or biased, the call evaluation of the same customer or operator has to be revised manually, and it takes a time to revise it, but it is possible to reduce such time and effort. Further, in the present system, the evaluation value is defined in accordance with the feature of each customer or each operator in addition to the common evaluation value defined on the system side, and thus it is possible to evaluate in a state closer to the call state or the call environment of the calling party.

What is claimed is:

1. A voice recognition system, comprising:
    a call recording device that records a call performed between a customer and an operator, the call corresponding to a first calling number of the customer;
    a voice recognition device that recognizes the call recorded by the call recording device and a value of voice feature information indicating a feature of a calling party in the call and accumulates a recognition result in a recognition result information table in a storage device; and
    a voice recognition result managing device that:
    acquires the recognition result from the recognition result information table;
    determines whether or not the first calling number included in the recognition result coincides with any calling number stored in an evaluation value-per-customer table by comparing the first calling number included in the recognition result with calling numbers stored in the evaluation value-per-customer table;
    when it is determined that there is no coinciding calling number in the evaluation value-per-customer table, reads an evaluation value for the customer among evaluation values stored in a common evaluation value table and executes an evaluation;
    when it is determined that there is a coinciding calling number in the evaluation value-per-customer table, reads the evaluation value stored in the evaluation value-per-customer table and executes the evaluation; and
    stores a result of the evaluation in the evaluation value-per-customer table.

2. The voice recognition system according to claim 1, wherein the voice recognition result managing device sets a reference value of the calling party on the basis of a statistical value of the voice feature information included in a recognition result of the calling party.

3. The voice recognition system according to claim 2, wherein the voice recognition result managing device acquires the recognition result in a predetermined period for calculating the statistical value from the storage device and calculates the statistical value of the value of the voice feature information in the period.

4. The voice recognition system according to claim 2, wherein the voice recognition result managing device evaluates the call of the calling party on the basis of the set reference value.

5. A call evaluation setting method, comprising:
    recording, by a call recording device, a call performed between a customer and an operator, the call corresponding to a first calling number of the customer;
    recognizing, by a voice recognition device, the recorded call and a value of voice feature information indicating a feature of a calling party in the call and accumulating a recognition result in a recognition result information table in a storage device;
    acquiring, by a voice recognition result managing device, the recognition result from the recognition result information table;
    determining, by the voice recognition result managing device, whether or not the first calling number included in the recognition result coincides with any calling number stored in an evaluation value-per-customer table by comparing the first calling number included in the recognition result with calling numbers stored in the evaluation value-per-customer table;
    when it is determined that there is no coinciding calling number in the evaluation value-per-customer table, reading, by the voice recognition result managing device, an evaluation value for the customer among evaluation values stored in a common evaluation value table and executes an evaluation;
    when it is determined that there is a coinciding calling number in the evaluation value-per-customer table, reading, by the voice recognition result managing device, the evaluation value stored in the evaluation value-per-customer table and executes the evaluation; and
    storing, by the voice recognition result managing device, a result of the evaluation in the evaluation value-per-customer table.

6. The call evaluation setting method according to claim 5, further comprising the step of:
    setting, by the voice recognition result managing device, a reference value of the calling party on the basis of a statistical value of the voice feature information included in a recognition result of the calling party.

7. The call evaluation setting method according to claim 6, further comprising the step of:
    acquiring, by the voice recognition result managing device, the recognition result in a predetermined period for calculating the statistical value from the storage device and calculates the statistical value of the value of the voice feature information in the period.

8. The call evaluation setting method according to claim 6, further comprising the step of:
    evaluatinq, by the voice recognition result managing device, the call of the calling party on the basis of the set reference value.

* * * * *